United States Patent [19]

Nyberg

[11] Patent Number: 4,988,409

[45] Date of Patent: Jan. 29, 1991

[54] PRESS FELT WITH ASYMETRIC FIBER CROSSSECTION IN A SURFACE LAYER OF LOWEST PERMEABILITY

[75] Inventor: Esko Nyberg, Tampere, Finland

[73] Assignee: Tamfelt Oy Ab, Tampere, Finland

[21] Appl. No.: 359,311

[22] Filed: May 31, 1989

[30] Foreign Application Priority Data

Jun. 8, 1988 [FI] Finland ................................ 882721

[51] Int. Cl.$^5$ ................................................ D21F 7/08
[52] U.S. Cl. ............................ 162/358; 162/DIG. 1; 428/218; 428/286
[58] Field of Search ............... 428/212, 218, 286, 287; 162/358, DIG. 1

[56] References Cited

U.S. PATENT DOCUMENTS

| | | | |
|---|---|---|---|
| 4,199,401 | 4/1980 | Liu et al. | 162/358 |
| 4,425,392 | 1/1984 | Oikawa et al. | 162/DIG. 1 |
| 4,529,643 | 7/1985 | Lundstrom | 162/DIG. 1 |
| 4,772,504 | 9/1988 | Andresen | 162/358 |

*Primary Examiner*—Karen M. Hastings
*Attorney, Agent, or Firm*—Lowe, Price, LeBlanc, Becker & Shur

[57] ABSTRACT

A press felt (4) is provided for transporting a fibre web (3) through the press section of a paper making machine for efficiently receiving water from the fibre web (3), the press felt (4) includes at least one fabric layer and a surface layer on both sides of the felt (4), the air permeability of both surface layers being substantially smaller than that of all fabric layers. In order to make the removal of water more efficient and to avoid the rewetting of the web, the air permeability of surface layer of the press felt away from the fibre web is substantially smaller than the air permeability of the surface layer on the opposite side of the press felt, i.e., the side adjacent the web.

7 Claims, 1 Drawing Sheet

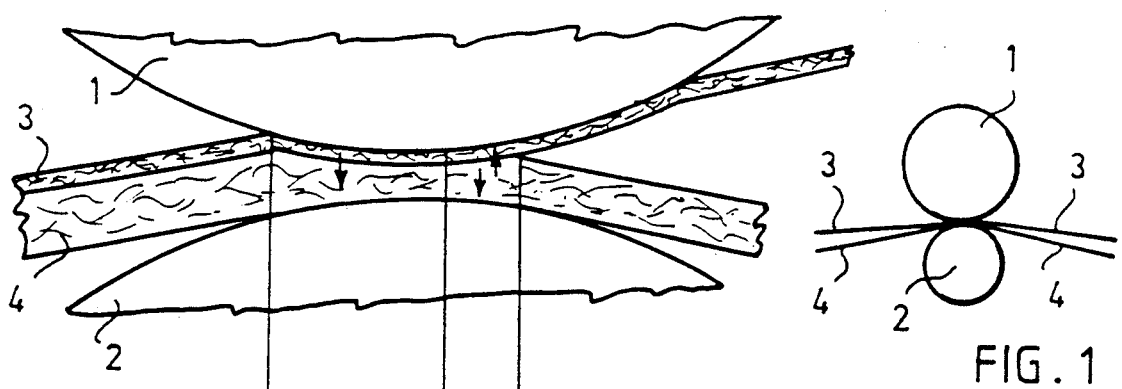
FIG. 1
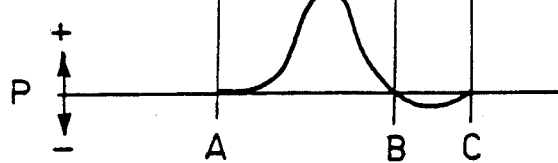
FIG. 2
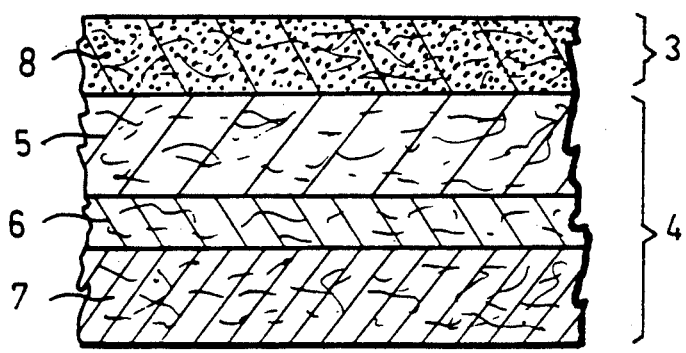
FIG. 4
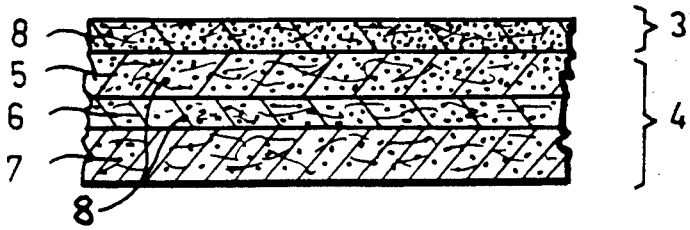
FIG. 3a
FIG. 3b
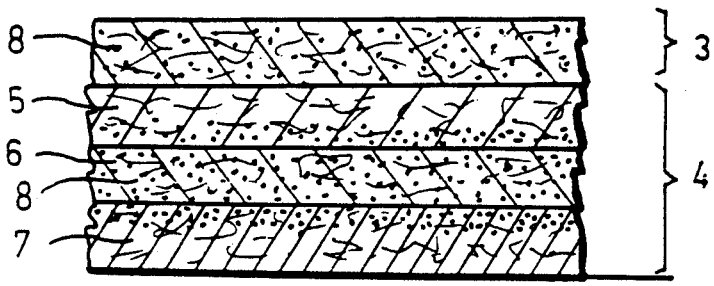
FIG. 3c

PRESS FELT WITH ASYMETRIC FIBER CROSSSECTION IN A SURFACE LAYER OF LOWEST PERMEABILITY

FIELD OF THE INVENTION

This invention relates to a press felt suitable for transporting a fibre web through the press section of a paper making machine and for receiving water from the fibre web. More particularly, this invention relates to a press felt comprising at least one fabric layer and a surface layer on both sides of the felt, the first surface layer of the felt being disposed on the side of the fibre web and the second surface layer of the felt on the rear being disposed to be facing away from the web, the air permeability of both surface layers being substantially smaller than that of all fabric layers.

BACKGROUND OF THE PRIOR ART

Press felts are used within the press section of paper machines and the like to transport the fiber web through the press section and, correspondingly, to receive water removed from the fibre web in the press, whereby water is removed from the felt separately. The use of prior art press felt structures causes rewetting problems because water cannot be removed from the felt until after the nip when the felt has been separated from the web. This is due to, e.g., the following reasons. When being pressed, the web and the felt are compressed, so that water contained in the web enters the felt, and thereby the water contained in the web and the water contained in the felt are in close contact. When the web and the felt return to their original dimensions after the nip, the capillary force caused by the structure of the web and the felt is considerably greater in the web than in the felt. As a result, the water remaining in the web is able to suck water from the felt through its surface layer so that the obtained water removal result is deteriorated considerably.

In prior art press felts, in an attempt to eliminate the effect of this phenomenon, the surface layer of the felt on the side of the web has been made as compact as possible in order to increase its capillary force to that the water would be sucked into the felt instead of being sucked into the web. However, no greater improvement in the rewetting problem has been obtained in this way.

SUMMARY OF THE INVENTION

A principal object of the present invention is to provide a press felt by means of which the rewetting can be prevented more effectively than previously, and the invention is characterized in that the air permeability of the surface layer on the rear side is substantially smaller than the air permeability of the surface layer on the side of the web.

The basic idea of the invention is that the press felt is made to act as a kind of vacuum pump in which the more compact surface layer on the rear side, i.e., the side away from the fibre web, acts as a pump diaphragm. When the felt expands after the nip, this surface layer sucks water contained in the felt from the surface layer on the side of the web into the less compact fabric layer of the felt. In this way, the water in the felt is isolated from the water contained in the web, and the influence of capillary forces is eliminated. This is due to the fact that the felt expands to a much greater degree than the web, whereby the vacuum created by the volume change of the felt has a greater effect on the water than the vacuum created in the web.

BRIEF DESCRIPTION OF THE DRAWINGS

The invention will be described in greater detail in the attached drawings, wherein:

FIG. 1 is a schematical view of a conventional press formed by rolls;

FIG. 2 is a schematical, more detailed view of a web and a felt in a nip, and of the hydraulic pressure prevailing at the nip;

FIGS. 3a–3c show the web and the felt of the invention at different points of the nip and the passing of water from the web to the felt; and FIG. 4 shows a cross-section of a fibre preferred for realizing the invention.

DESCRIPTION OF THE PREFERRED EMBODIMENTS

FIG. 1 shows a press comprising rolls 1 and 2. A fibre web 3 and a press felt 4 are led together through the press, so that water contained in the web 3 enters a space defined by the pores of the fabric of the felt 4.

FIG. 2 illustrates the behavior of the web 3 and the felt 4 in greater detail in the press shown in FIG. 1. The figure, in its lower half, also illustrates the pressure acting on water within the web and the felt at different points of the press section. On reaching the press section, the web 3 and the felt 4 are exposed to a compression pressure at point A. This pressure compresses the web 3 and the felt 4, so that the pressure exerted on the water contained in the web 3 forces water out of the web 3 into the pores of the fabric of the felt 4. The flow of the water continues up to point B in the direction shown by the arrow until the pressure exerted on the water is removed when the expansion of the web 3 and the felt 4 begins. Beginning from point B, the web 3 and the felt 4 expand rapidly, whereby a vacuum is created therewithin, and the water tends to be displaced towards the web 3 under the influence of the capillary phenomenon.

FIGS. 3a–3c are more detailed views of the operation of the felt of the invention at different points of the nip. In FIG. 3a, corresponding to the situation of FIG. 2 at point A, water 8 is contained in the web 3 the fibre fabric of which is not shown for the sake of clarity. The water fills substantially all empty space between the fibres of the web 3. The felt 4 comprises a first surface layer 5 on the side of the web; a fabric layer 6; and a second surface layer 7 on the rear side. At this stage, corresponding to point A in FIG. 2, the felt 4 does not contain any substantial amounts of water but the empty spaces in the fabric layer 6 indicated with oblique lines and the surface layers 5 and 7 indicated with diamond patterns are filled with air. In FIG. 3b, corresponding to point B in FIG. 2, the web 3 and the press felt 4 are in compressed state, and the water 8 which has filled the empty space between the fibres of the web 3 has been partially pressed into the cavities of the felt 4, thus removing air out of the felt 4.

When the web 3 and the felt 4 are displaced from point B towards point C, both begin to return to their original thickness, so that a vacuum is created in both of them. In the invention, the rear side surface layer 7 of the felt 4 is less permeable to air than the surface layer 5 on the side of the web, as a result of which air is hardly able to flow from the rear side surface layer 7 towards the water contained in the fabric layer 6, so that a vacuum is created therein which is greater than in conventional press felts. The vacuum causes water to be sucked towards the rear side surface layer 7, being isolated from the water contained in the web 3. As the water contained in the web 3 and the water contained in the felt 4 are substantially isolated from each other, there occurs no capillary effect between the water contained in the web 3 and the water contained in the felt 4 at the interface between the web and the felt, and, as a consequence, water will not be sucked back into the web from the felt.

The surface layers of the press felt of the invention can be manufactured in various ways known per se. The surface layer 5 on the side of the web 3 can be manufactured in a conventional way by needling a fluffy and smooth layer of a suitable material to the fabric layer 6, or a sufficiently smooth surface layer with the required properties can be formed in some other way as well. The surface layer 7 on the rear side far from the web 3, in turn, can be made of a substantially compact material, such as polyurethane or other similar material. The surface layer 7 on the rear side may also be made by needling to the back surface of the fabric layer 6 a fluffy layer more compact than an possibly needled more densely and/or of a thinner fibre than the surface layer 5 on the side of the web 3, whereby in all cases its permeability to air is smaller than that of the surface 5 on the side of the web.

In a particularly preferred embodiment of the invention, the rear side surface layer 7 is formed by a fibre 9 with an asymmetric cross-section shown in FIG. 4. When fixed suitably, such a fibre acts in a valve-like manner. When the fibre 9 is fixed to the fabric in such a way that its thinner edge is mostly positioned farther out than its thicker edge, the pressure created in the felt 4 presses the thinner edge outwards, thus allowing air to flow out of the felt more easily. Correspondingly, when a vacuum is created in the felt, it draws the thinner edge more tightly towards the felt, whereby openings in the rear side surface layer are sealed so that the layer becomes even less permeable to air. Consequently, less air flows through the rear side surface layer, and the ability of the felt to suck water farther away from the web is improved, thus improving the water separation ability of the web.

Only a few embodiments of the invention have been set forth above, and the invention is in no way restricted thereto. The surface layers can be manufactured in various ways, and they can be fixed to the fabric layer in a manner best suited in each particular case. The fabric layer may be formed by one of more fabrics which can be similar or dissimilar.

I claim:

1. A press felt, for transporting a fiber web through the press section of a paper machine and for removing water from the fiber web, comprising:
   at least one fabric layer;
   a first surface layer of the felt, said first surface layer comprising a first fiber, disposed on said at least one fabric layer on a side adjacent the fiber web; and
   a second surface layer of the felt, said second surface layer comprising a second fiber, disposed at a side of said at least one fabric layer to be facing away from the web;
   the air permeability of both said first and second surface layers being substantially smaller than that of all fabric layers in said press felt and the air permeability of said second surface layer being substantially smaller than the air permeability of said first surface layer adjacent the web, the second fiber being asymmetric in cross-section.

2. A press felt according to claim 1, wherein
   the second surface layer comprises a material substantially impermeable to air.

3. A press felt according to claim 1, wherein:
   the second surface layer is formed by said second fiber thereof needled to the at least one fabric layer.

4. A press felt according to claim 1, wherein:
   the second fiber is finer than the first fiber.

5. A press felt according to claim 1, wherein:
   said second surface layer comprises polyurethane.

6. A press felt for transporting a fiber web through the press section of a paper machine and for removing water from the fiber web, comprising:
   at least one fabric layer;
   a first surface layer of the felt, said fist surface layer comprising a first fiber needled to the at least one fabric layer, disposed on said at least one fabric layer on a side adjacent the fiber web; and
   a second surface layer of the felt, disposed at a second side of said at least one fabric layer facing away from the web;
   the air permeability of both said first and second surface layers being substantially smaller than that of all fabric layers in said press felt and the air permeability of said second surface layer being substantially smaller than the air permeability of the first surface layer adjacent the web,
   wherein the second surface layer comprises a material substantially impermeable to air, is formed by a second fiber needled to the at least one fabric layer, the second fiber being finer and more densely needled than the first fiber and being of assymetric cross-section.

7. A press felt according to claim 6, wherein:
   said second surface layer comprises polyurethane.

* * * * *